(12) United States Patent
Cnossen et al.

(10) Patent No.: US 12,090,723 B2
(45) Date of Patent: Sep. 17, 2024

(54) METHOD OF MANUFACTURING A SHELL OF A WIND TURBINE BLADE

(71) Applicant: LM WIND POWER A/S, Kolding (DK)

(72) Inventors: Jelmer Cnossen, Hampshire (GB); Paul Todd, Hampshire (GB)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 18/039,942

(22) PCT Filed: Dec. 20, 2021

(86) PCT No.: PCT/EP2021/086762
§ 371 (c)(1),
(2) Date: Jun. 1, 2023

(87) PCT Pub. No.: WO2022/136256
PCT Pub. Date: Jun. 30, 2022

(65) Prior Publication Data
US 2024/0001636 A1 Jan. 4, 2024

(30) Foreign Application Priority Data
Dec. 22, 2020 (EP) ..................................... 20216644

(51) Int. Cl.
*B29D 99/00* (2010.01)
*F03D 1/06* (2006.01)
*F03D 80/00* (2016.01)

(52) U.S. Cl.
CPC ....... *B29D 99/0028* (2013.01); *F03D 1/0675* (2013.01); *F03D 1/069* (2023.08);
(Continued)

(58) Field of Classification Search
CPC ................... F03D 1/0675; F03D 1/069; F05B 2240/3042; B29L 2031/085;
(Continued)

(56) References Cited

U.S. PATENT DOCUMENTS 9,108,376 B2 * 8/2015 Austinat ............... B29C 33/306
2011/0018282 A1 1/2011 Hayashi et al.
(Continued)

FOREIGN PATENT DOCUMENTS

CN 111379661 A * 7/2020
CN 113352669 A * 9/2021
(Continued)

*Primary Examiner* — Topaz L. Elliott
(74) *Attorney, Agent, or Firm* — Nath, Goldberg & Meyer; Jerald L. Meyer; Tanya E. Harkins

(57) ABSTRACT

A method for manufacturing a shell 36 and 38, is disclosed. The method includes laying one or more layers of fibres, on a surface of a mould 9 to form at least a portion of a shell half structure 36 and 38. A first panel 11 defined with noise reduction members 11a is positioned adjacent to the one or more layers of fibres on the surface of the mould 9. Further, resin is infused through the one or more layers of fiber and the first panel 11 and is subsequently cured to obtain the shell half structure 36 or 38, where the first panel 11 with noise reduction members 11a adheres to the shell half structure 36 and 38 upon curing the infused resin.

17 Claims, 6 Drawing Sheets

(52) U.S. Cl.
CPC .... *F03D 80/005* (2023.08); *F05B 2240/3042* (2020.08); *F05B 2260/96* (2013.01)

(58) Field of Classification Search
CPC ....... B29L 2031/082; B29L 2031/3085; B29L 2031/087; B29C 70/302; B29C 66/324
See application file for complete search history.

(56) References Cited

U.S. PATENT DOCUMENTS

| | | | |
|---|---|---|---|
| 2014/0369845 A1* | 12/2014 | Ruijter | F01D 5/141 416/224 |
| 2015/0078910 A1* | 3/2015 | Oerlemans | F03D 1/0641 29/889.1 |
| 2016/0319801 A1 | 11/2016 | Smith | |
| 2017/0051718 A1* | 2/2017 | Klitgaard | B29C 70/545 |
| 2017/0082088 A1* | 3/2017 | Yarbrough | B29D 99/0028 |
| 2017/0252984 A1* | 9/2017 | Ruijter | B29D 99/0025 |
| 2020/0149507 A1* | 5/2020 | Arce | F03D 1/0675 |
| 2022/0145850 A1* | 5/2022 | Nielsen | F03D 1/0675 |
| 2023/0347600 A1* | 11/2023 | Henrichsen | B29C 70/342 |

FOREIGN PATENT DOCUMENTS

| | | |
|---|---|---|
| EP | 2811156 A1 | 6/2014 |
| WO | 95/19500 A1 | 7/1995 |
| WO | 2016041557 A1 | 3/2016 |

* cited by examiner

METHOD OF MANUFACTURING A SHELL OF A WIND TURBINE BLADE

This is a National Phase Application filed under 35 U.S.C. 371 as a national stage of PCT/EP2021/086762, filed Dec. 20, 2021, an application claiming benefit of European Application No. 20216644.3, filed Dec. 22, 2020, the content of each of which is hereby incorporated by reference in its entirety.

FIELD OF THE INVENTION

Present disclosure relates to a field of wind energy. Particularly but not exclusively, the present disclosure relates to a method of manufacturing a shell of a wind turbine blade. Further embodiments of the present disclosure disclose a method of manufacturing the shell of the wind turbine blade, where noise reduction members become an integral part of the wind turbine blade during the manufacturing of the shell of the wind turbine blade.

BACKGROUND OF THE DISCLOSURE

Wind power is one of the fastest-growing renewable energy technologies that provides a clean and environmentally friendly source of energy. Typically, wind turbines comprise of a tower, a generator, a gearbox, a nacelle, and one or more rotor blades. The kinetic energy of the wind is captured using known airfoil principles. Modern wind turbines may have rotor blades that exceed 90 meters in length for generating high volumes of power.

Wind turbine blades are defined by a leading edge and a trailing edge. Modern wind turbine blades suffer from trailing edge noise generated by the airflow passing over the aerodynamic profile of the wind turbine blade. The airflow transforms from a substantially laminar airflow into a turbulent airflow over suction and pressure sides of the wind turbine blade. The turbulent air flow generates vortices behind the trailing edge of the wind turbine blade and the vortices result in a hissing sounds at about one kilohertz.

With advancements in technologies, noise reducing devices are configured to the trailing edge section of the wind turbine blade. One or more noise reducing devices are attached at or near the trailing edge of the wind turbine blade. These noise reducing devices generally include a plurality of serrations projecting from one or more base plates positioned along the trailing edge of the wind turbine blade. The serrations prevent the formation of vortices along the trailing edge of the wind turbine blade and thereby reduce the subsequent aerodynamic noise generated during the rotation of the wind turbine blade. The serrations are typically 1-3 mm thick and have a length of typically 10% of the chord length. The serrations are generally manufactured as separate panels and are commonly attached to the trailing edge of the wind turbine blade after the manufacturing of the wind turbine blade. The above process of separately manufacturing the wind turbine blade and attaching the panel with serrations to the trailing edge of the wind turbine blade is a tedious and time-consuming task. Furthermore, when the serration panels are attached to the trailing edge of the wind turbine blade, the point of contact between the trailing edge and the serrations panel may not always be even. There may exist a difference in height along the region transitioning between the serrations panel and the trailing edge of the wind turbine blade and there may exist a step in the surface along the trailing edge of the wind turbine blade. Such difference in height may result in aerodynamic drag. The difference in height or the step along the trailing edge is smoothened by a filler to obtain a smoother transition between blade surface and serration panel. However, such modifications often cause the original airfoil shape of the wind turbine blade to be distorted. Consequently, the overall operational efficiency of the wind turbine blade is reduced significantly.

The serration panels are often transported to an assembly field where the wind turbine is to be built and are assembled to the trailing edge of the wind turbine blade on the field. Serration panels are attached to the wind turbine blade in the field to avoid or minimize transportation and handling damage. The application of the panels in the field requires the use of adhesive which needs time to reach its ultimate adhesion strength. Once applied, the adhesive can lose its strength over time and serration panels may become detached from the wind turbine blade. Consequently, the noise caused by the wind turbine blade at the trailing edge can increase significantly. Further, the panels with serrations attached to the wind turbine blade suffer from loss of noise reduction performance, particularly when the serrations are not aligned with the main flow direction. Aligning the serration on field becomes a complex task which is prone to errors.

SUMMARY OF THE INVENTION

In a non-limiting embodiment of the disclosure, a method for manufacturing a shell is disclosed. The method includes, laying one or more layers of fibers, on a surface of a mould to form at least a portion of a shell half structure. A panel defined with noise reduction members is positioned adjacent the one or more layers of fibres on the surface of the mould. Further, resin is infused through the one or more layers of fiber and the first panel and the same is subsequently cured to obtain the shell half structure wherein the first panel with noise reduction members adheres to the shell half structure upon curing the infused resin.

In an embodiment, the shell half structure is defined with a leading edge and a trailing edge, where the first panel is adjoined adjacent to the at least one of the leading edge and the trailing edge, preferably to the trailing edge of the shell half structure.

In an embodiment, the first panel is defined with a first end and a second end with the first end defined with noise reduction members.

In an embodiment, the second end of the first panel is positioned between the one or more layers of fibres forming the trailing edge of the shell half structure.

In an embodiment, a second panel is adjoined with the first panel, where the second panel is defined with projections complementing the profile of the noise reduction members.

In an embodiment, the second panel is made of silicone material. A third end of the second panel is defined with projections is adjoined to the first end of the first panel.

In an embodiment, the projections defined in the second panel mate with the noise reduction members of the first panel defining a first region.

In an embodiment, a peel ply is fused on the first region before infusing the resin on the one or more layers of fiber and the first panel.

In an embodiment, the peel ply is peeled off from the first region after the resin is infused and cured from the one or more layers of fiber and the first panel In an embodiment, the second panel is separated from the first panel along with the peel ply when the peel ply is separated from the first region.

In a non-limiting embodiment of the disclosure, a method of manufacturing a wind turbine blade having a profiled contour including a pressure side and a suction side, and a leading edge and a trailing edge with a chord having a chord length extending therebetween, is disclosed. The wind turbine blade extending in a spanwise direction between a root end and a tip end, the method includes, laying one or more layers of fibres, on a surface of a mould to form a first shell half structure and a second shell half structure separately. Joining a first panel defined with noise reduction members to at least one of the leading edge and the trailing edge, preferably to the trailing edge of the at least one of first shell half structure and the second shell half structure by resin infusion process. Joining the first shell half structure with the second shell half structure to obtain the wind turbine blade.

In a non-limiting embodiment of the disclosure, a system for manufacturing a shell is disclosed. The system includes a mould with an inner surface complementing a profile of the shell. One or more layers of fibres are laid on the inner surface to form at least a portion of a shell half structure. A support surface adjoining the inner surface is configured, where the support surface is profile to support a panel defined with noise reduction members adjacent to the one or more layers of fibres in the inner surface of the mould. The resin is subsequently cured to obtain the shell half structure where the first panel with noise reduction members adheres to the shell half structure upon curing the infused resin.

BRIEF DESCRIPTION OF THE ACCOMPANYING FIGURES

The invention is explained in detail below with reference to an embodiment shown in the drawings, in which.

DETAILED DESCRIPTION

The following paragraphs describe the present disclosure with reference to FIGS. 1 to 9.

Figure 1:
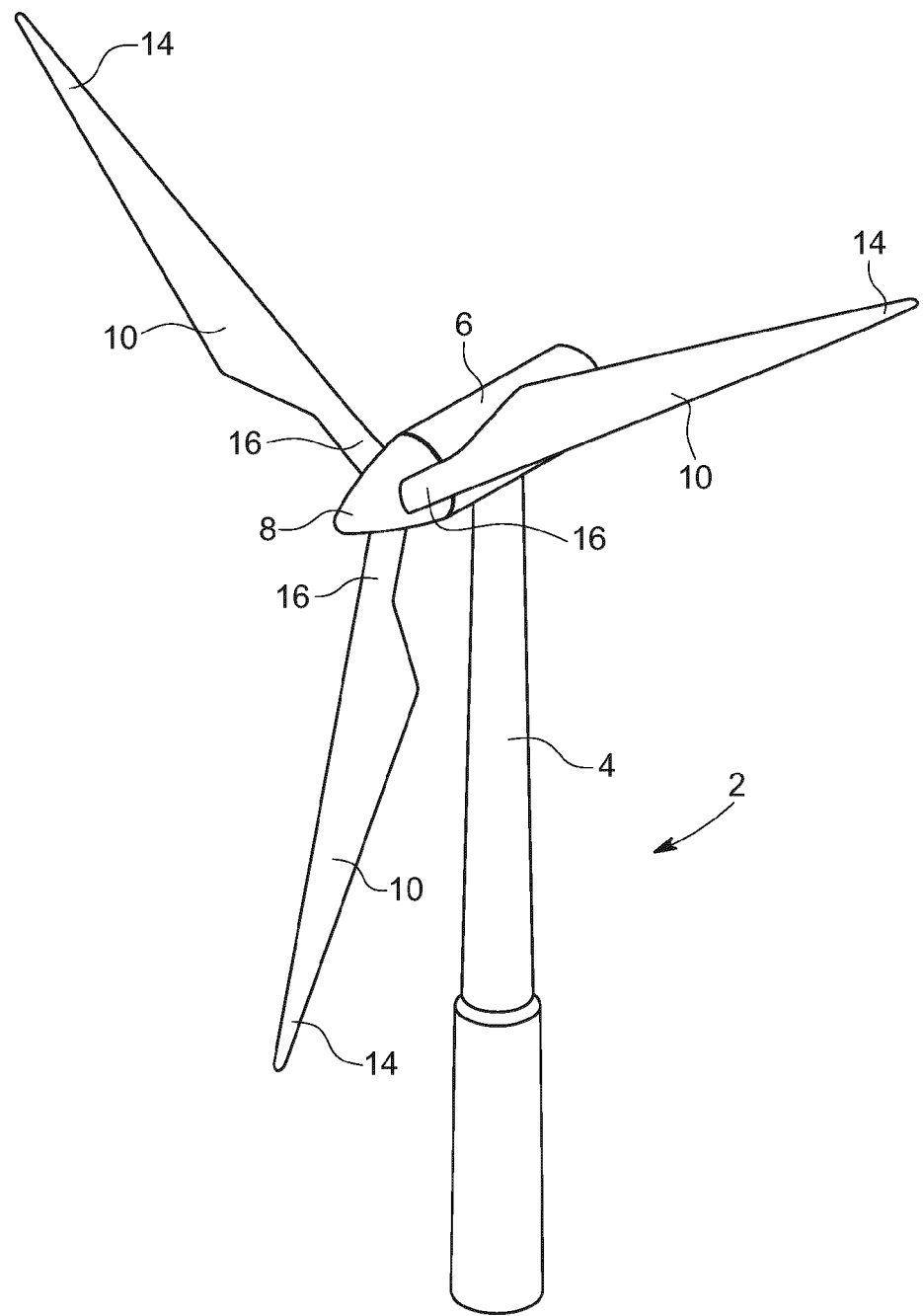
FIG. 1 shows a perspective view of the wind turbine, in accordance with an embodiment of the disclosure.

FIG. 1 illustrates an upwind wind turbine according to the "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8.

Figure 2:
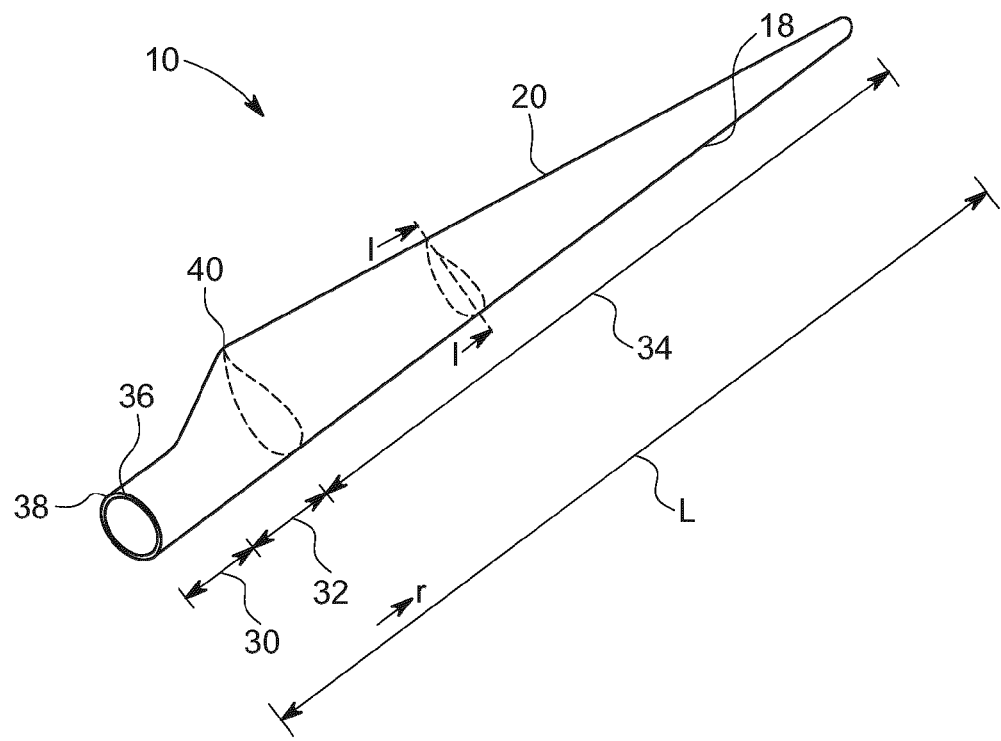
FIG. 2 shows a perspective view of a wind turbine blade, in accordance with an embodiment of the disclosure.

FIG. 2 shows a perspective view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 also called the profiled region has an ideal or almost ideal blade shape with respect to generating lift, whereas the root region 30 due to structural considerations has a substantially circular or elliptical cross-section, which for instance makes it easier and safer to mount the blade 10 to the hub 8. The diameter or the chord of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance "r" from the hub 8. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34. FIG. 2 also illustrates the longitudinal extent L, length, or longitudinal axis of the blade.

It should be noted that, the chords of different sections of the blade 10 normally do not lie in a common plane, since the blade may be twisted and/or curved i.e., pre-bent, thus providing the chord plane with a correspondingly twisted and/or curved course, this being most often the case in order to compensate for the local velocity of the blade being dependent on the radius from the hub.

The blade is typically made from a pressure side shell part 36 that may also be called as first shell half structure 36 and a suction side shell part 38 may also be called as second shell half structure 38 that are glued to each other along bond lines at the leading edge 18 and the trailing edge of the blade 20.

Figure 3:
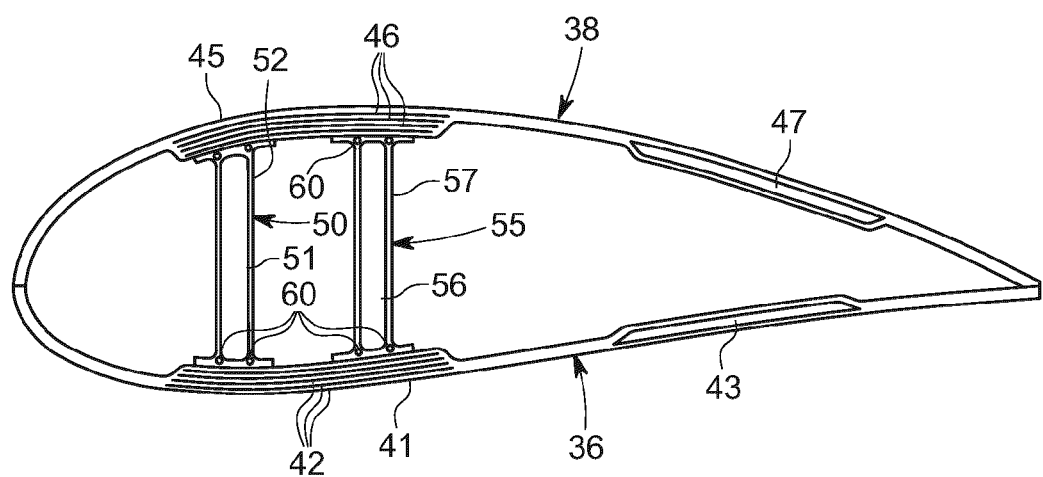
FIG. 3 shows a cross-sectional view of the blade along axis I-I shown in FIG. 2, in accordance with an embodiment of the disclosure.

FIG. 3 shows a schematic view of a cross section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fiber layers 42 mainly comprising unidirectional fibers aligned along the longitudinal direction of the blade 10 in order to provide stiffness to the blade. The suction side shell part 38 also comprises a spar cap 45 comprising a plurality of fiber layers 46. The pressure side shell part 38 may also comprise a sandwich core material 43 typically made of balsawood or foamed polymer and sandwiched between a number of fiber-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fiber layers. The blade shells 36, 38 may comprise further fiber-reinforcement at the leading edge and the trailing edge. Typically, the shell parts 36, 38 are bonded to each other via glue flanges.

Figure 4:
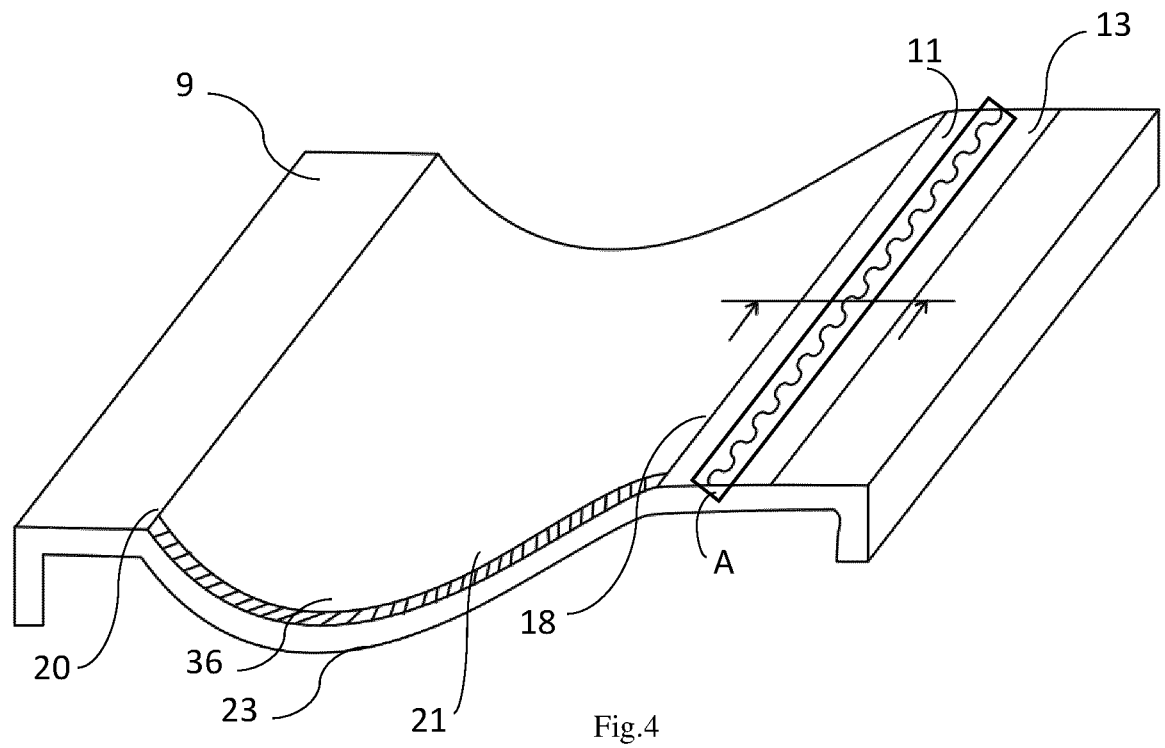
FIG. 4 illustrates a perspective view of a mould with shell and noise reduction member adhered to the shell, in accordance with an embodiment of the disclosure.
Figure 5:
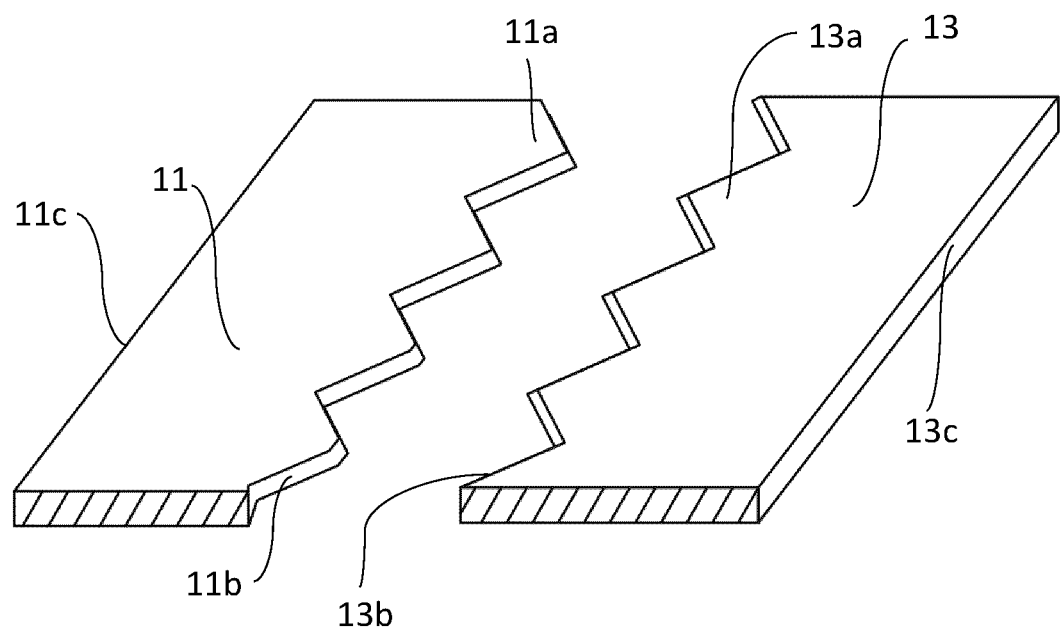
FIG. 5 illustrates a perspective view of a first panel with the noise reduction members and the second panel with complementary projections, in accordance with an embodiment of the disclosure.
Figure 6:
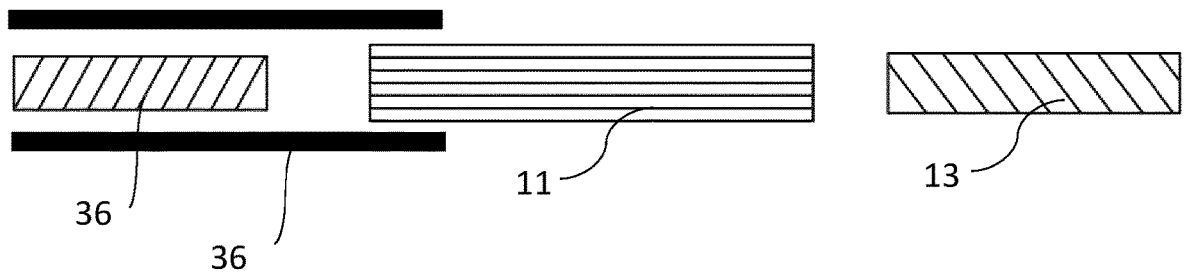
FIG. 6 illustrates a side view of the mould with the first panel and the second panel, in accordance with an embodiment of the disclosure.
Figure 7:
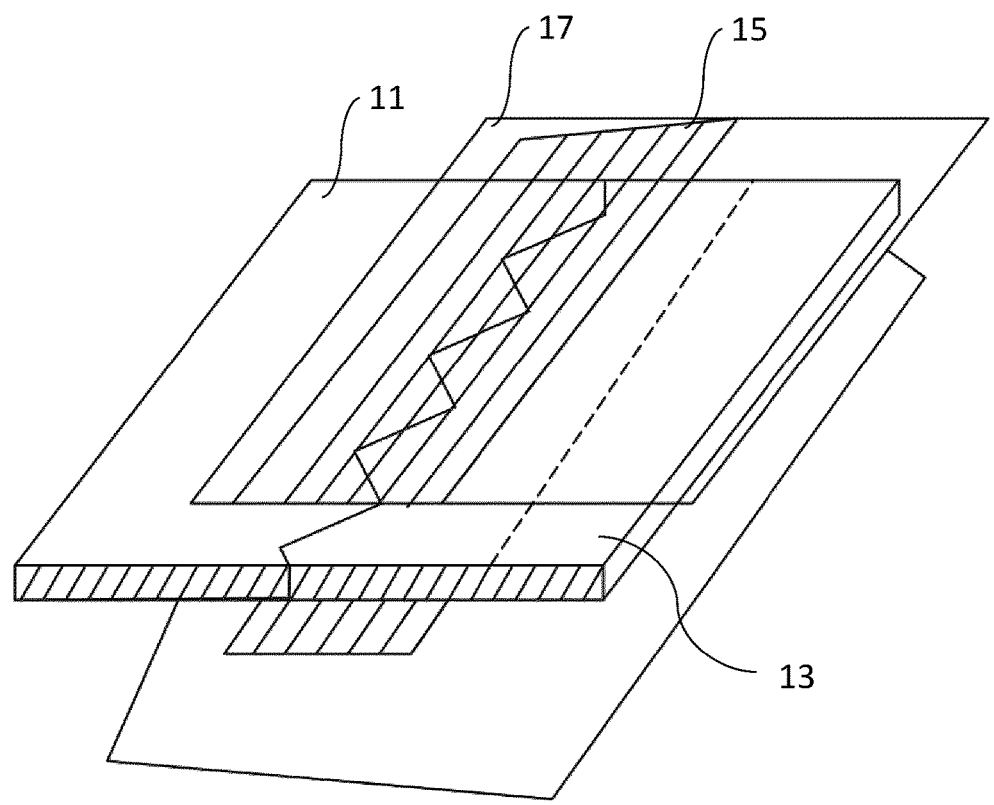
FIG. 7 illustrates a perspective view of the first panel and the second panel in an assembled state with peel ply, in accordance with an embodiment of the disclosure.

FIG. 4 illustrates a perspective view of a mould 9 with noise reduction members 11a. FIG. 5 illustrates a perspective view of a first panel 11 with the noise reduction members 11a and the second panel 13 with the projections 13a. The mould 9 may be defined with an outer surface 23 and an inner surface 21. The inner surface 21 of the mould may accommodate fiber reinforcement and/or fiber fabrics. A first panel 11 defined with a plurality of noise reduction members 11a may be placed on support surface of the mould 9 along the trailing edge 20 of the pressure side's shell half structure 36. Further, a second panel 13 defined with a plurality of projections 13a may be positioned on the support surface of the mould 9 adjacent to the first panel 11. The first panel 11 may be defined by a first end 11b and a second end 11c. The first end 11b of the first panel 11 may be defined with the plurality of noise reduction members 11a. The noise reduction members 11a may be of triangular shape with sharp edges. Further, the second panel 13 may be defined by a third end 13b and a fourth end 13c. The third end 13b of the second panel 13 may be defined with a plurality of projections 13a. The shape of the projections 13a defined on the second panel 13 may be configured to complement the profile of the noise reduction members 11a defined on the first panel 11. A first region "A" is defined, when the projections 13a defined in the second panel 13 mate with the noise reduction members 11a of the first panel 11. FIG. 6 illustrates a side view of the mould 9 with the first panel 11 and the second panel 13. The second end 11c of the first panel 11 is positioned between the one or more layers of fibers forming the trailing edge 20 of the shell half structure 36 or 38. FIG. 7 illustrates a perspective view of the first panel 11 and the second panel 13 in an assembled state with peel ply 15 and backer film 17. The backer film 17 may extend throughout the surface area of the first panel 11 and the second panel 13, whereas the peel ply may be provided only along the first region "A" defined by the first panel 11 and the second panel 13. In some embodiments, peel ply may be replaced with any releasable films.

In an embodiment, the noise reduction members 11a are serrations. In an embodiment, the height of the serrations may vary along the length of the trailing edge 20 of the wind turbine blade 10 for improved aerodynamic efficiency.

In an embodiment, the second panel is made of silicone or any other flexible material which does not absorb the resin during the resin infusion process.

Figure 9:
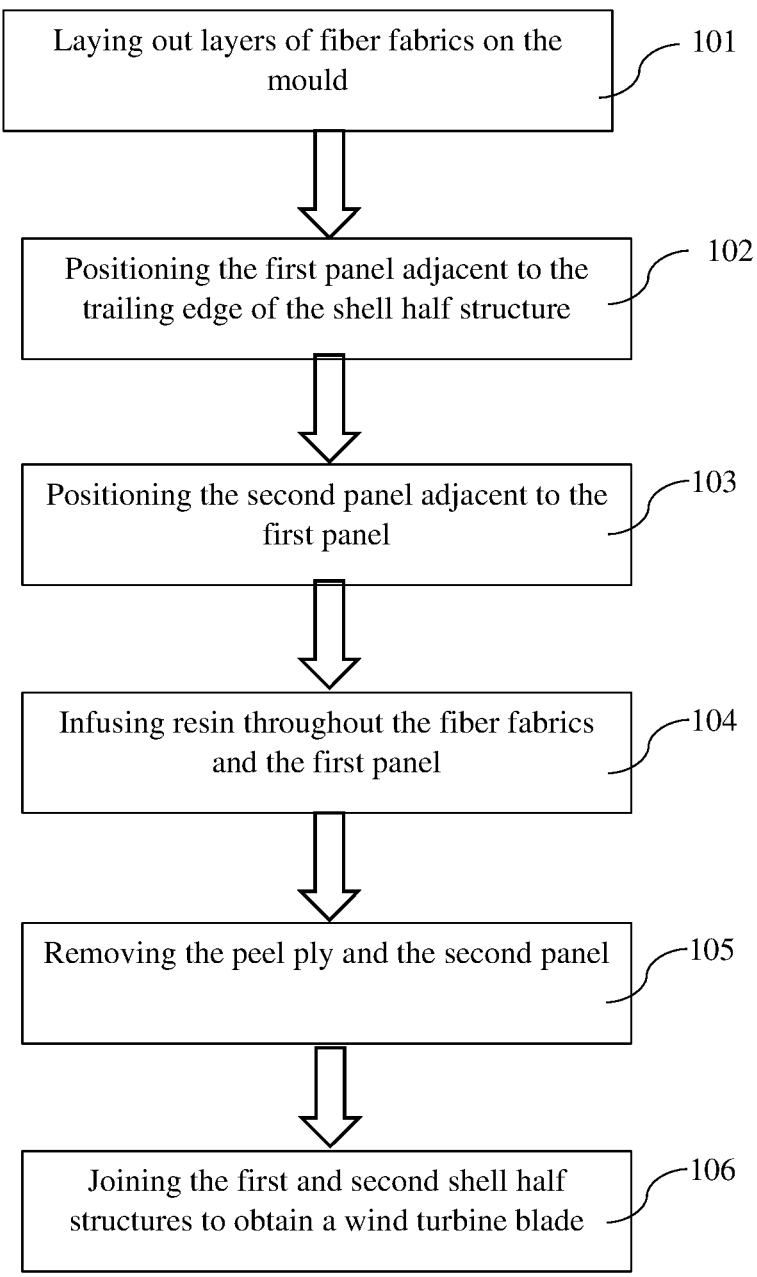
FIG. 9 is a flowchart of the method of manufacturing a wind turbine blade, in accordance with an embodiment of the present disclosure.

FIG. 9 is a flowchart of the method of manufacturing a wind turbine blade 10. The first step 101 involves laying out multiple layers of fiber fabrics on the inner surface 21 of the mould 9. Initially, a gel coat or primer is typically applied to the inner surface 21 mould 9. Multiple layers of fiber fabrics may be positioned on the mould 9 and the layers of fiber fabrics on the mould 9 may include aramid fiber fabrics, glass fiber fabrics, carbon fiber fabrics or hybrid fiber fabrics made of glass and carbon. Other, fiber fabrics not limiting to the above-mentioned fabrics which are known in the art may also be used. The next step 102 involves, positioning the first panel 11 on the support surface adjoining the inner surface 21 of the mould 9 such that the first panel is adjacent to the trailing edge 20 of the pressure side's shell half structure 36. The first panel 11 may be positioned such that the second end 11c of the first panel 11 abuts the fiber fabrics along the trailing edge 20 of the pressure side's shell half structure 36. The second end 11c of the first panel 11 is positioned between the one or more layers of fibers forming the trailing edge 20 of the shell half structure 36 or 38 as seen from FIG. 6. Further, at step 103, the second panel 13 is placed adjacent to the first panel 11 as seen from FIG. 4 and FIG. 7. The second panel 13 is arranged such that the third end 13b of the second panel 13 abuts the first end 11b of the first panel 11. The projections 13a defined on the second panel 13 are positioned between the noise reduction members 11a of the first panel 11. The second panel 13 is positioned with the first panel 11 such that the second panel 13 defined with projections 13a complements the profile of the noise reduction members 11a of the first panel 11. The area or the region where the projections 13a of the second panel 13 and the noise reduction members 11a of the first panel 11 mate, is defined as the first region "A".

Figure 8:
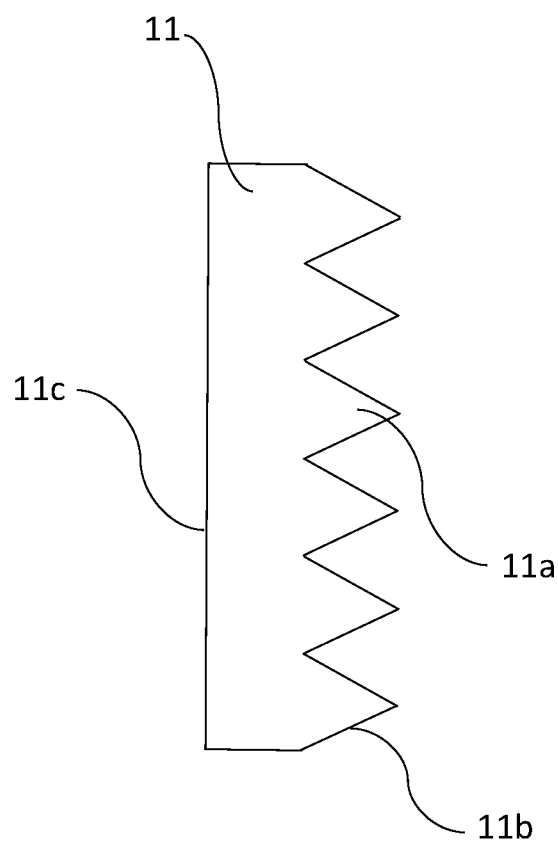
FIG. 8 illustrates a top view of the first panel with the noise reduction members, in accordance with an embodiment of the disclosure.

Further, the peel ply 15 is fused along the first region "A" such that the peel ply 15 may partially extend beyond the noise reduction members 11a and the projections 13a of the first panel 11 and the second panel 13, respectively. Step 104 involves infusing resin throughout the fiber fabrics and the first panel. The resin may seep through the fabric fibers and bond with the first panel 11 along the second end 11c of the first panel 11. Thus, the first panel 11 may be fixedly connected to the trailing edge 20 of the pressure side's shell half structure 36. The shape of the noise reduction members 11a remains intact as the resin is prevented from seeping through into the first region "A" by the peel ply 15 and the second panel 13. The configuration of the second panel 13 where the projection 13a of the second panel 13 mate with the noise reduction members 11a of the first panel, ensures that the resin does not seep through into the sharp edges of the noise reduction members 11a. Further, the peel ply 15 fused over the first region "A" also ensures that the resin does not seep through into the sharp edges of the noise reduction members 11a of the first panel 11. FIG. 8 illustrates a top view of the first panel 11 with the noise reduction members 11a and the above-mentioned configuration of the first panel 11, the second panel 13 and the peel ply 15, assures sharp edges are retained on the noise reduction members 11a as seen from FIG. 8. Consequently, sharper corner radii of the noise reduction members 11a is achieved which offer greater aero performance and improved noise reduction during the rotation of the wind turbine blade 10 by preventing the formation of vortices along the trailing edge 20. Further, a vacuum is typically used to draw epoxy resin material into the mould 9 and the resin is allowed to be cured. Several other moulding techniques are known for manufacturing wind turbine blades, including compression moulding and resin transfer moulding. However, not limiting to the above-mentioned techniques, any of the methods of manufacturing pressure and suction shell which are known in the art may be used. The next step 105 involves the removal of peel ply 15 and the second panel 13. After the resin is cured and the first panel 11 with the noise reduction members 11a is connected to the trailing edge 20 of the wind turbine blade 10, the peel ply 15 is peeled off from the first panel 11. The second panel 13 is also removed along with the peel ply 15 as the peel ply 15 is peeled from the first panel 11. Thus, the geometry of the noise reduction members 11a remains unchanged and the need for further machining may be completely avoided. The final step 106 involves the positioning of the shear web and connecting the pressure side shell half structure 36 with suction side shell half structure 38. The shear web 7 may be positioned in the shells of the pressure side shell half structure 36 or the suction side shell half structure 38. Further, after the shear web 7 is positioned in the shells 36 or 38 the pressure and suction side shell half structures are joined together. The shell structures 36 and 38 may be assembled by bonding them together along a peripheral edge of the shell structures 36 and 38. The peripheral portion along the trailing edge 20 and leading edge 18 of the shell structures 36 and 38 may be applied with a suitable bonding paste or adhesive and the shell structures 36 and 38 may be suitably joined together to form the wind turbine blade 10.

In an embodiment, the noise reduction members 11a may be positioned and connected to the trailing edge 20 of the second shell half structure 38 during the manufacturing process. In an embodiment, the noise reduction members 11a may be positioned and connected to the trailing edge 20 of the first shell half structure 36 and the second shell half structure 38 during the manufacturing process i.e., moulding process.

In an embodiment, the first panel 11 and the second panel 13 may be pre-assembled, by sandwiching with a backer film 17 and stored. The above assembly may be directly positioned against the trailing edge 20 of the shell half structure 36 or 38 during the manufacturing process.

In an embodiment, the above-mentioned method of manufacturing the wind turbine blade 10 reduces manufacturing costs since, the noise reduction members 11a are directly integrated with the wind turbine blade 10 during the manufacturing of the wind turbine blade 10.

In an embodiment, the positioning of the second panel 13 and the peel ply 15 ensures that the geometry or the sharp edges of the noise reduction members 11a remains unchanged and the need for further machining is completely avoided. Consequently, the noise reduction members 11a have sharper corner radii which improves the operational efficiency of the noise reduction members 11a.

In an embodiment, the overall aerodynamic shape of the wind turbine blade 10 is retained as the noise reduction members 11a are manufactured as an integral part of the wind turbine blade 10 when compared with conventional methods where the serration panels were attached to the trailing edge 20 after the manufacturing of the wind turbine blade 10, resulting in a step or a difference in height between the serrations panel and the wind turbine blade.

In an embodiment, critical edge definition sharpness of the noise reduction members 11a is improved due to the use of peal ply 15. The peel ply 15 removes excess resin from seeping into the first region "A" and minimises or even eliminates time consuming and thus costly edge clean up.

REFERRAL NUMERALS

- 2 wind turbine
- 4 tower
- 6 nacelle
- 8 hub
- 9 mould
- 10 blade
- 11 first panel
- 11a noise reduction members
- 11b first end of the first panel
- 11c second end of the first panel
- 13 second panel
- 13a projections
- 13b third end of the second panel
- 13c fourth end of the second panel
- 14 blade tip
- 15 peel ply
- 16 blade root
- 17 backer film
- 18 leading edge
- 20 trailing edge
- 30 root region
- 32 transition region
- 34 air foil region
- 36 pressure side shell half structure
- 38 suction side shell half structure
- 40 shoulder
- 42 fibre layers
- 43 sandwich core material
- 46 fibre layers
- 47 sandwich core material
- 50 first shear web
- 51 core member
- 52 skin layers
- 55 second shear web
- 56 sandwich core material of second shear web
- 57 skin layers of second shear web
- 60 filler ropes

The invention claimed is:

1. A method for manufacturing a shell (36 and 38), the method comprising:
    laying one or more layers of fibers, on a surface of a mould (9) to form at least a portion of a shell half structure (36 and 38);
    positioning a first panel (11) defined with noise reduction members (11a) adjacent the one or more layers of fibers on the surface of the mould (9);
    fusing a peel ply (15) on a first region (A);
    following the fusing of the peel ply (15) on the first region (A), infusing resin through the one or more layers of fibers and the first panel (11), and subsequently curing the same to obtain the shell half structure (36 or 38), wherein the first panel (11) with noise reduction members (11a) adheres to the shell half structure (36 and 38) upon curing the infused resin; and
    adjoining a second panel (13) with the first panel (11), wherein the second panel (13) is defined with projections (13a) complementing a profile of the noise reduction members (11a).

2. The method according to claim 1, wherein the shell half structure (36 or 38) is defined with a leading edge (18) and a trailing edge (20), wherein the first panel (11) is adjoined adjacent to the at least one of the leading edge (18) and the trailing edge (20).

3. The method according to claim 2, wherein the first panel (11) is adjoined adjacent to the trailing edge (20) of the shell half structure (36 or 38).

4. The method according to claim 1, wherein the first panel (11) is defined by a first end (11b) and a second end (11c) with the first end (11b) defined with the noise reduction members (11a).

5. The method according to claim 4, wherein the second end (11c) of the first panel (11) is positioned between the one or more layers of fibers forming a trailing edge (20) of the shell half structure (36 or 38).

6. The method according to claim 4, wherein an end of the second panel (13) defined with projections (13a) is adjoined to the first end (11b) of the first panel (11).

7. The method according to claim 1, wherein the second panel (13) is made of a silicone material.

8. The method according to claim 1, further comprising peeling off the peel ply (15) from the first region (A) after the resin is infused and cured from the one or more layers of fibers and the first panel (11).

9. The method according to claim 8, wherein the second panel (13) is separated from the first panel (11) along with the peel ply (15) when the peel ply (15) is separated from the first region (A).

10. A wind turbine blade (10) comprising a shell half structure (36 and 38) and a first panel (11) defined with noise reduction members (11a) adhered to the shell half structure (36 and 38) through the resin infusion process as claimed in claim 1.

11. The method according to claim 1, wherein the projections (13a) defined in the second panel (13) mate with the noise reduction members (11a) of the first panel (11) defining the first region (A).

12. A method of manufacturing a wind turbine blade (10) having a profiled contour including a pressure side and a suction side, and a leading edge (18) and a trailing edge (20) with a chord having a chord length extending therebetween, the wind turbine blade (10) extending in a spanwise direction between a root end and a tip end, the method comprises:

laying one or more layers of fibers, on a surface of a mould (9) to form a first shell half structure (36) and a second shell half structure (38) separately;

joining a first panel (11) defined with noise reduction members (11a) to at least one of a leading edge (18) and a trailing edge (20) of the at least one of first shell half structure (36) and the second shell half structure (38);

fusing a peel ply (15) on a first region (A);

following the fusing of the peel ply (15) on the first region (A), infusing resin through the one or more layers of fibers and the first panel (11), and subsequently curing the same to obtain one of the first shell half structure or the second shell half structure (36 or 38), wherein the first panel (11) with noise reduction members (11a) adheres to the one of the first shell half structure or the second shell half structure (36 and 38) upon curing the infused resin;

adjoining a second panel (13) with the first panel (11), wherein the second panel (13) is defined with projections (13a) complementing the profile of the noise reduction members (11a), wherein the projections (13a) defined in the second panel (13) mate with the noise reduction members (11a) of the first panel 11 defining the first region (A); and joining the first shell half structure (36) with the second shell half structure (38) to obtain the wind turbine blade (10).

13. The method according to claim 12, wherein the first panel (11) is defined by a first end (11b) and a second end (11c) with the first end (11b) defined with the noise reduction members (11a) and the second end (11c) positioned between the one or more layers of fibers forming the trailing edge (20) of the one of the first shell half structure or the second shell half structure (36 or 38).

14. The method according to claim 12, wherein the second panel (13) is made of a silicone material.

15. The method according to claim 12, further comprising peeling off the peel ply (15) from the first region (A) after the resin is infused and cured from the one or more layers of fibers and the first panel (11).

16. The method according to claim 15, wherein the second panel (13) is separated from the first panel (11) along with the peel ply (15) when the peel ply (15) is separated from the first region (A).

17. The method according to claim 12, wherein the first panel (11) defined with the noise reduction members (11a) is joined to the trailing edge (20) of the at least one of the first shell half structure (36) and the second shell half structure (38).

* * * * *